Oct. 13, 1936.  J. E. WOODBURY  2,057,549
RANGE FINDER
Filed May 11, 1935
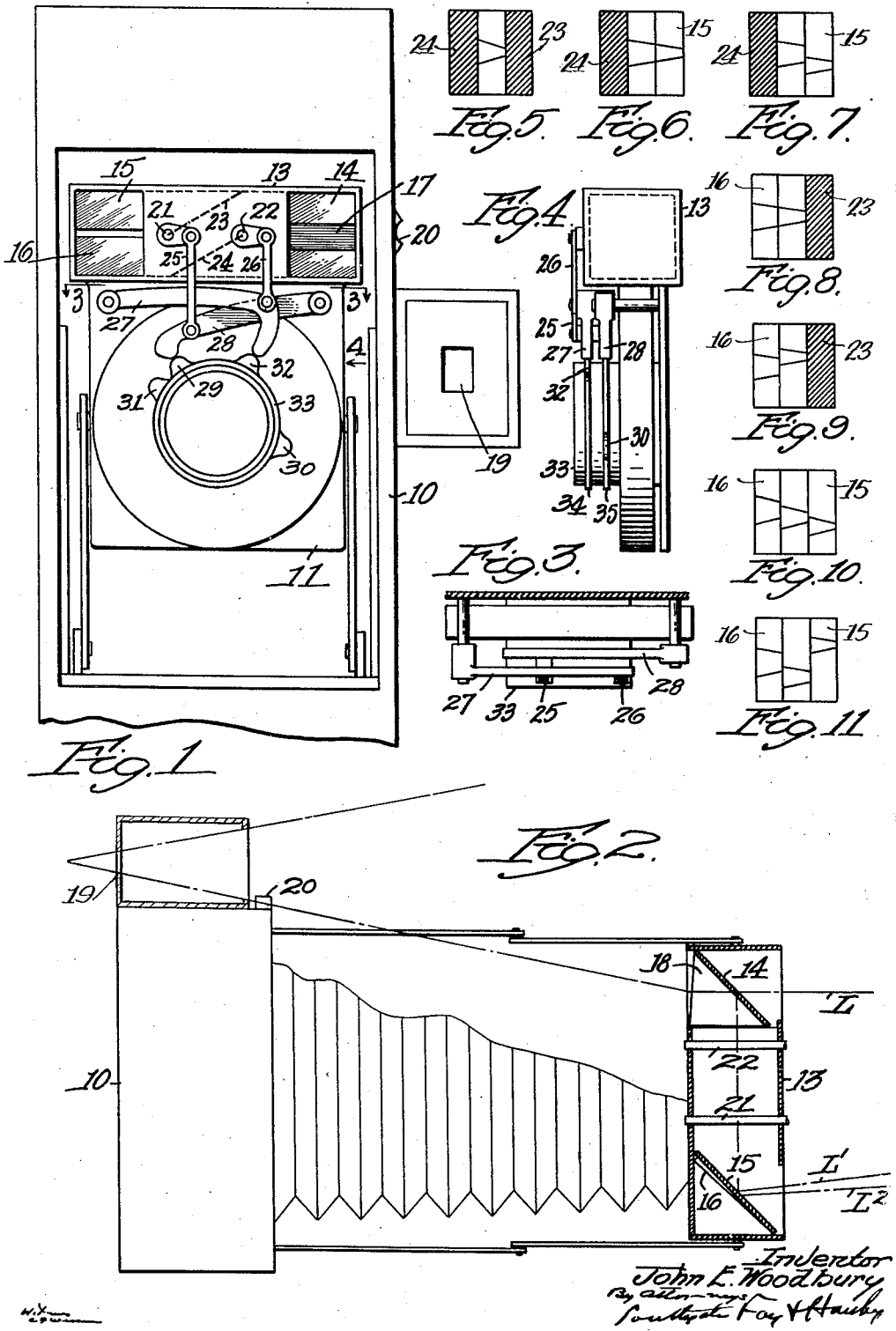

Patented Oct. 13, 1936

2,057,549

UNITED STATES PATENT OFFICE 2,057,549

RANGE FINDER

John E. Woodbury, Worcester, Mass.

Application May 11, 1935, Serial No. 21,043

13 Claims. (Cl. 95—44)

This invention relates to a range finder, particularly adapted for camera work.

The principal objects of the invention are to provide a range finder supplying two points of exact focus very accurately and thoroughly, affording the operator a basis for precision work at certain distances and a basis for comparison for the securing of estimates at all other distances; to provide a means whereby a serviceable valuable focusing aid of the greatest simplicity, which is very easy to manufacture and get into adjustment with a minimum danger of disorder, is obtained, capable of functioning at any time; to provide for directing a plurality of rays of light through the range finder which will not interfere with each other and will permit of the focusing of the camera at the two or more specific distances for which it is constructed; to provide means for blinding or darkening either one of these rays of light so that each one can be used separately without confusion; to provide a construction of range finder that can be placed in a convenient position on a camera, involving a light deflector, such as a mirror or prism, broad enough to cover the two rays mentioned and having a blank space between them so that blinders can be arranged to shut off the light from either part of said deflector; and to provide means connected with the focusing of the lens for operating the blinders at the proper time in accordance with the turning of the lens for getting the desired focused distance.

Other objects and advantages of the invention will appear hereinafter.

Reference is to be had to the accompanying drawing, in which—

Fig. 1 is a front view of a camera showing a preferred embodiment of this invention applied thereto;

Fig. 2 is a top view showing only the range finder and a little of the camera and illustrating the rays of light;

Fig. 3 is a sectional view, on the line 3—3 of Fig. 1, of the operating means for the range finder;

Fig. 4 is a side view of the same taken in the direction of the arrow in Fig. 1; and Figs. 5 to 11 inclusive are views showing the images produced under different conditions indicating the darkened portions and the ray of light. Each one shows shaded the mirrors 23 and 24 and unshaded the mirrors 15 and 16. The central portion in each figure indicates the clear portion in the mirror 14.

At the present time well known types of range finders are used which either read the distance in feet, or meters, or are placed so that the co-ordination with the camera lens is complete. This type of range finder is arranged on a different basis than that stated above.

The range finder is shown as applied to an ordinary type of camera 10 of the modern type in which the front 11 snaps out instead of coming out on a track. The range finder body 13 preferably is located in stationary position above the lens and on the front of the board. This is a convenient place to locate the range finder but it can be located in other positions. At one side of the range finder is a light deflector, shown as a mirror 14, arranged preferably at an angle of 45 degrees. At the opposite side of the range finder are two separate light deflectors, shown as mirrors 15 and 16, arranged preferably permanently at two separate angles at nearly 45 degrees. These mirrors could all be replaced by prisms. The ray of light from the object passes through the clear space 17 in the mirror 14 and then through the prism 18 to produce a slight angular deflection to the view finder 19. From the mirrors 15 and 16 two rays $L'$ and $L^2$ are reflected across the instrument to the mirror 14 which is set at such an angle that the reflected ray $L'$ meets L at exactly 6 feet. This gives the effect of registration of the images seen through 14 and 15 and 17 when the object sighted is at 6 feet. In a similar way the mirror 16 is set at such an angle to the mirror 14 that the coincidence of the light angle is at 15 feet, showing exact registration at that point (see Fig. 2). In that figure the ray of light L passes through the mirror 14 because this mirror has its central portion scraped clear of silver at 17 for that purpose.

It will be seen that, in an instrument of this type, it is possible to detect immediately and with accuracy two separate distances. The invention is not limited to merely two but more mirrors can be used. Furthermore, it is obvious that the 6 and 15 foot distances are not essential but any plurality of distances can be chosen and the focus will be made at those distances with great accuracy.

It seems desirable to mount the prism 18 on the side of the range finder to which the light is directed from the object to the eye for the purpose of turning the ray of light to about the angle shown in Fig. 2 so that the operator, looking slightly downwardly into the range finder from the edge of the camera at 20, through a view finder 19, will be sighting in a direction parallel with the camera lens axis. Thus the camera may be turned approximately to the proper direction to take the picture which is desired. This makes it easier to view the images involved and introduces no other difficulty.

A sight knob 20 is mounted on the side of the camera which makes it easier to glance through the instrument without moving the eye very much from the position in which it is normally used on a direct vision view finder.

In the case illustrated the range finder has fitted into it, between the two sets of mirrors or other light deflectors 14, 15 and 16, two shafts 21 and 22. These are fitted with small blades 23 and 24 of steel or other suitable non-light transmitting material serving as shutters or blinds. These blinds are fastened to the two shafts. The shafts are provided with two links 25 and 26 extending downwardly, in the present instance, which are connected with pivoted levers 27 and 28. These levers have ends adapted to be engaged by cams 29, 30, 31 and 32 mounted on the usual focusing ring 33 by means of cam rings 34 and 35.

It is intended that this instrument should be fitted on the front of a camera of the modern type in which the focusing between 100 feet and the shortest distance that is likely to be used, as for example 6 feet, is accomplished by turning the focusing ring 33 of the lens one way or the other in a well known manner. This constitutes a ring which holds the lens. In the present case the amount of angular turn between 100 feet and 6 feet is assumed to be a very little less than three-quarters of a complete circle.

The support of the two links 25 and 26 and levers 27 and 28 is shown in Fig. 3.

Fig. 4, as stated, shows a side view of the range finder and the two cam rings are clearly shown cooperating with the two levers, which are operated by them in such fashion that it is perfectly easy to see how the blinds 23 and 24 are actuated, as has been described.

The focusing ring 33 is fitted with two cam rings 34 and 35 fixed thereon. The ring 34 is mounted in front and has two cams 31 and 32. The ring 35 has two cams 29 and 30. These cams oscillate with their respective rings. When the lens is set at 100 feet both blinds 23 and 24 are closed. This gives the effect shown in Fig. 5 when the instrument is used in the manner intended. In this case there is no reflection through either mirror 15 or 16 from the mirror 14.

If the camera lens is turned to such position that it is in focus, the cam rings 34 and 35 are turned with the lens and the cams 29, 30, 31 and 32 turn with them. When the lens has been turned around so that the focus is at 15 feet, the cam 30 comes to the position in which the cam 29 is shown in Fig. 1. This will result in closing the blind 23 whereas the blind 24 will be in a position to permit light to pass from the mirror 16 to the mirror 14. Consequently, the effect is that represented in Fig. 8, thus making it very easy to check accurate focus when the object is 15 feet away from the camera. If the object is at a different distance the result will be as shown in Fig. 9, which clearly indicates that the camera is not focused on the object at 15 feet.

In a similar way when the camera lens is set at 6 feet it will be found that the blind 24 closes off the mirror 16 and therefore, when the object is at 6 feet and the camera lens is set at 6 feet, the result will be as shown in Fig. 6. If the camera lens is set at 6 feet and the object is not at 6 feet, the result will be as shown in Fig. 7.

It will be noticed that at all distances, other than 6, 15 and 100 feet, the range finder will be open in all three fields of vision, the direct light going through the clear center of the mirror 14 and both the mirrors 15 and 16, carrying their respective images in sight. The reason for this is that it depends only on the skill and ingenuity of the operator to be able to detect quite a wide variety of other distances by the degree of relative displacement of the three images. The most easily detected one of these relations is at about 9 feet where the effect gives the object in focus and the camera lens is set at 9 feet to show about as in Fig. 10, where the displacement differences between the three images is about even. On the other hand, if any irregularity is seen and the result looks like Fig. 11, it will be known at once that it is not in focus unless very careful estimate between the focus and scale and the distance estimated is made.

It would seem at first sight that a range finder of this description, where three distances can be determined, two of which can be determined with extreme accuracy, and the third estimated with precision, is a very limited type of instrument as compared with the fully coordinated range finders which are the subject of several patents, including my own Patents Nos. 1,166,032, Dec. 28, 1915, 1,238,473 and 1,238,474 patented Aug. 28, 1917. As a matter of fact, where the limitation might be estimated at a glance as, say, 70% deficient, the real fact is that this is not more than 15 or 25% deficient at the most. As one estimates, the difficulty is to correlate an accurate estimate to the general magnitude of one's surroundings. For instance, suppose that a careful attempt is made to estimate 6 feet and 15 feet in a small room. When this estimate is made out-of-doors, where spaces are large, the estimate for 15 feet is too large. In other words, two "yardsticks" are carried, 6 feet and 15 feet, so that they can always be correlated to some object in the distance. This makes it possible to make accurate estimates under almost any conditions. It has been found quite easy to make estimates as used at least two or three times as accurately as can be made without the use of this instrument. The instrument comprises a comparatively small amount of mechanism and is much more cheaply manufactured than the range finders on the market and is almost impossible to get out of order.

It will be understood, of course, that the distances 6 and 15 feet are selected arbitrarily but they are convenient distances. The mirrors can be set up orginally for other different distances and they will be shown with great exactness. The adjustment of the mirrors 15 and 16, of course, is made when the instrument is manufactured but it can be made very simply and the danger of loss of adjustment is practically nothing. The range finder can be used satisfactorily by a skilled operator and is in its most elementary form for that purpose and yet this system lends itself very neatly to application to a conventional modern camera of the type in which the focusing is accomplished by the simple means of having a rotating lens mount operate the blinds and can be used satisfactorily by an amateur photographer with a very minimum chance of error in focusing.

It should be stated that when the camera is set at 100 feet both sides of the range finder should be darkened by the blinds and, in fact, it is preferred that at all other distances than 6 and 15 feet, for instance, the blinds should both be opened as a warning that some judgment must be used to secure a perfectly focused result.

The range finder can be secured on the camera in many ways but it seems most universally desirable to have it put crosswise above the lens on the conventional hand camera. This puts it in a convenient position to be related to the turning lens and entirely out of the way of the holding mechanism which supports the lens board in the proper position.

Having thus described my invention and the advantages thereof, I do not wish to be limited to the details herein disclosed, otherwise than as set forth in the claims, but what I claim is:—

1. A range finder comprising a ray deflector, and a plurality of ray deflectors arranged to turn rays toward the first named ray deflector, but at different angles.

2. A range finder comprising a ray deflector, a plurality of ray deflectors arranged to turn rays toward the first named ray deflector, but at different angles, and means for shutting off the rays from any of the plurality of ray deflectors.

3. A range finder comprising a mirror, and a plurality of ray deflectors arranged to turn rays toward the mirror, but at different angles, the mirror having a clear space to allow direct rays of light to pass.

4. A range finder comprising a mirror set at about 45 degrees to a ray of light directed toward the camera and having a clear space at the center, and two mirrors about parallel to the first mirror but at a slight angle to each other, and each arranged to cooperate with one part of the first mirror independently.

5. A range finder comprising a mirror set at an angle to a ray of light directed toward the camera and having a clear space at the center, two mirrors about parallel to the first mirror but at a slight angle to each other, each arranged to cooperate with one side of the mirror, and blinds for closing off the rays from each of said two mirrors to the first named mirror.

6. A range finder comprising a mirror set at about 45 degrees to a ray of light directed toward the camera and having a clear space at the center, two mirrors about parallel to the first mirror but at a slight angle to each other, each arranged to cooperate with one side of the first mirror, blinds for closing off the rays from each of said two mirrors to the first named mirror, and means for operating said blinds independently.

7. In a range finder of a type suitable for use on a camera, the combination with a camera, of a ray deflector constructed to pass some of the rays directly, and a plurality of ray deflectors at different exact angles to the first ray deflector, whereby the exact measurement of the plurality of distances corresponding to the angles of the second set of deflectors can be made.

8. In a camera of the focusing type, the combination of a rotatable lens, a lens mount mounted to rotate therewith, ray deflectors, blinds arranged to close off the rays of light to certain of said ray deflectors, and means movable with the lens mount for operating said blinds.

9. In a camera of the focusing type, the combination of a rotatable lens mount, a mirror set at an angle in the line of a ray of light coming from the object being focused to the eye of the operator and having a clear space, a pair of mirrors set at nearly the angle of the first mirror but at slightly different angles for reflecting rays of light to the first mirror, blinds for obstructing the light from one mirror to another, and cams carried by the lens mount for closing said blinds.

10. The combination of a hand camera of the focusing type, with a range finder for the purpose of focusing, said range finder comprising a plurality of mirrors, each in fixed relation to the others, one of said mirrors being adapted to receive rays from either one of the others so that the mirrors cooperate in different pairs to establish accurately a certain distance of focus for each pair.

11. The combination of a hand camera of the focusing type with a range finder for the purpose of focusing, comprising a plurality of sets of ray deflectors arranged to deflect the rays of light at different angles, means for automatically permitting different sets of ray deflectors to be viewed when the lens of the camera is focused on different distances related to the exact angle between the respective sets of deflectors.

12. In a camera of the focusing type, the combination with the apparatus for focusing, of a lens, blinds for shutting off the rays of light through the focusing apparatus, and means cooperating with the focusing apparatus and the blinds for coordinating the operation of the lens with the effects of the focusing apparatus.

13. A range finder comprising a view finder and two ray deflecting surfaces having a clear space between them for passing rays to the finder, comprising means in a position for deflecting said rays as they pass to the view finder.

JOHN E. WOODBURY.